Patented June 20, 1939

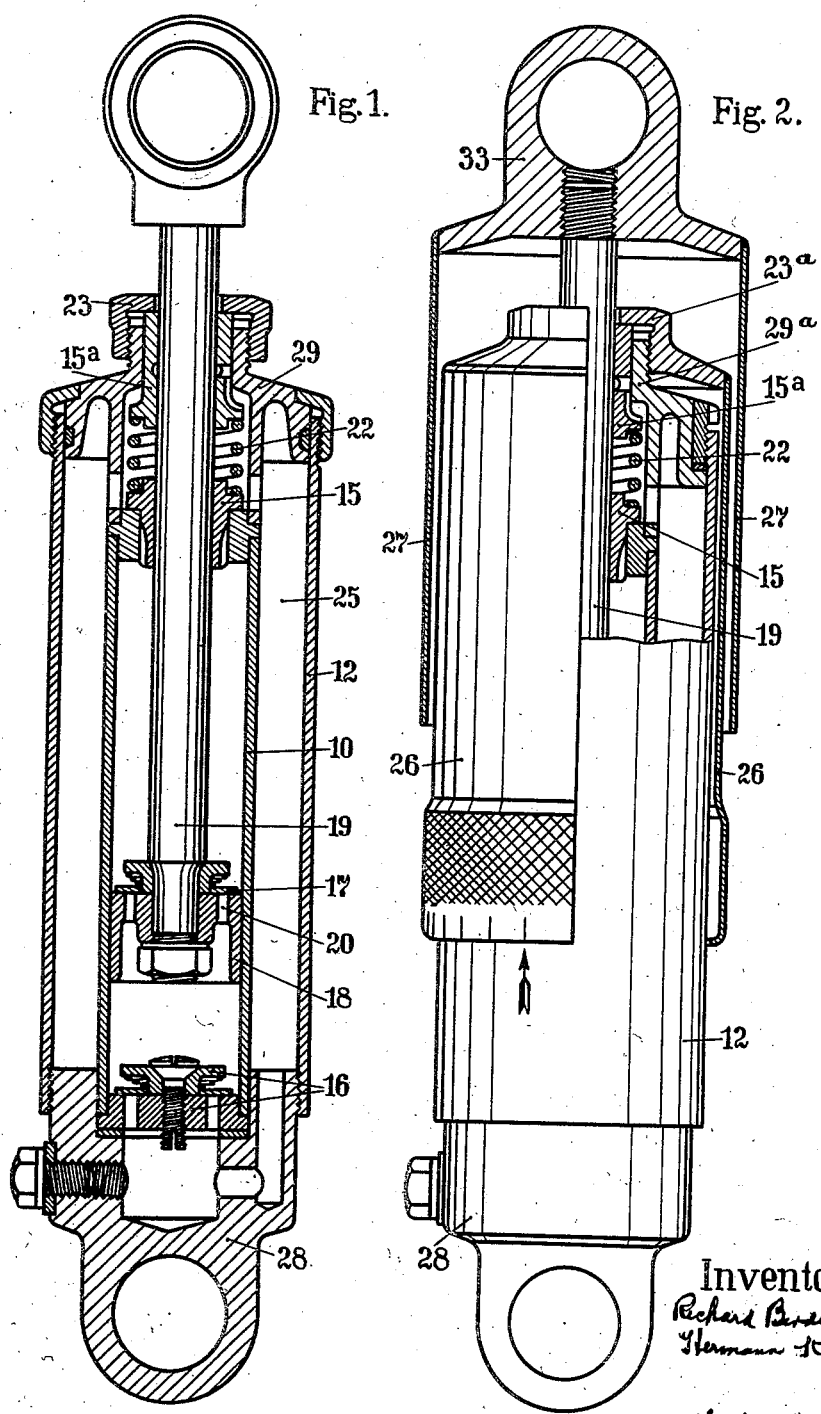

2,163,254

UNITED STATES PATENT OFFICE 2,163,254

HYDRAULIC SHOCK ABSORBER WITH REGULATING DEVICE

Richard Binder and Hermann Klein, Schweinfurt, Germany

Application May 13, 1937, Serial No. 142,398
In Germany May 16, 1936

8 Claims. (Cl. 188—88)

The invention relates to a shock absorber of tubular shape adapted to be inserted between spring-supported and supporting elements of vehicles, such as automobiles, while the shock absorber is of the usual construction in which a pump and the piston rod are directly connected to the relatively movable parts.

More particularly the invention relates to a regulating device for a hydraulic shock absorber of the piston and cylinder type, comprising a casing, surrounding the cylinder and serving as liquid container for the return flow, and a spring loaded throttle valve at the head of the cylinder, forming a passage from the cylinder to the liquid container.

The object of this invention is to provide an improved regulating device for a shock absorber of this type whereby the apparatus may be regulated by hand from the exterior without requiring the dismantling of any part and while the shock absorber is in its position of use on the vehicle.

As a feature of the present invention I provide an interiorly screw threaded cap which is screwed on a threaded tubular extension arranged externally on the upper end of the said casing above the valve chamber on the head of the cylinder and which is adapted to be moved from the exterior of the said casing. This cap acts upon the upper end of a sleeve, which passes out of the valve chamber through the said extension of the casing and which is freely movable co-axially with respect to the piston rod. This sleeve bears against the spring of the said valve, and the threaded cap by its adjustment displaces the sleeve and varies the stress in the spring.

The annexed drawings, which form a part of this specification, illustrate three embodiments of the shock absorber according to the invention. In the drawings—

Fig. 1 is a longitudinal sectional view of a shock absorber with regulating means easily accessibly located at the upper end thereof;

Fig. 2 shows partly in section a modification with a protecting mantle, the means for operating the regulating device projecting downward out of the mantle.

Like numerals denote like or corresponding parts throughout all figures of the drawings.

Figure 3:
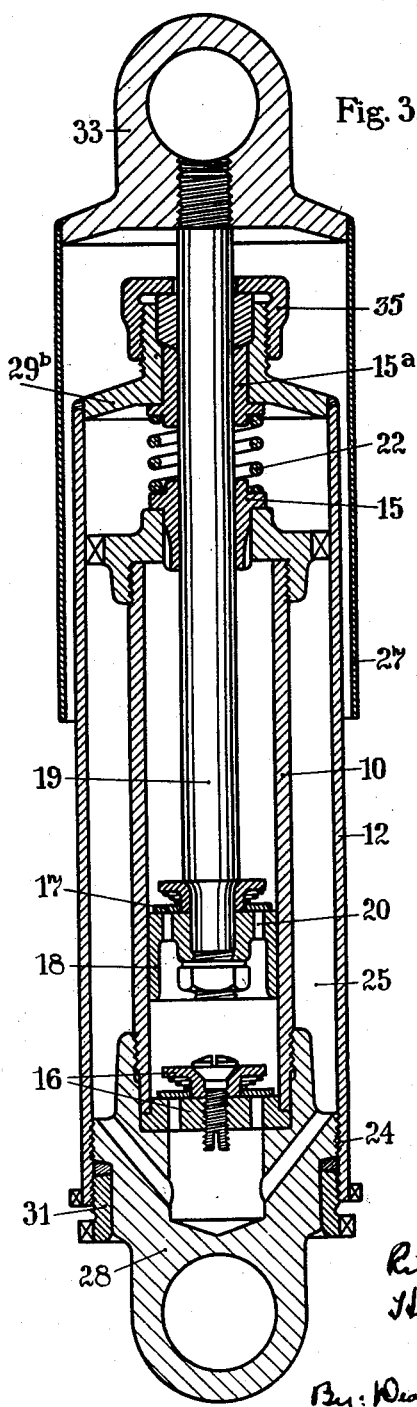
Fig. 3 is a further constructional embodiment in which the shell or housing of the shock absorber constitutes the regulating handle.

Referring first to Fig. 1, the pump like shock absorber comprises a cylinder 10, a piston 18 reciprocable therein, a non-return valve 17 and channels 20 devised in said piston so that the working liquid can only be moved in the cylinder in one direction, viz. lifted in this example, and a piston rod more or less projecting out of the cylinder. Further, a non-return foot valve 16 is mounted in the lower end of the cylinder. The pump is concentrically surrounded by a shell 12 which is attached to the pump cylinder through a head piece 29 and a foot piece 28 in any well known manner, such as screwing, soldering, electrical brazing or like methods. The space left between the tubes 10 and 12 constitutes the return conduit for the back flow of the working liquid and is in open communication with the interior of the pump through the foot valve 16. In the upper end of the pump there is disposed a regulating valve 15 which is pressed on its seat by a powerful spring 22 the other end of which bears against the flanged inner end of a sleeve 15a shiftably guided in a central bore of the head piece 29, a cap 23 screwed on the head piece permitting to shift the sleeve 15a and thus to regulate the tension of the spring 22 for varying the throttling effect of the valve 15 upon the passage of the liquid from the upper end of the pump to the conduit 25.

When the shock absorber is applied to a vehicle in the usual manner and entirely or almost entirely filled with the working liquid, ex. g., oil, the space 25 will at the same time act as a reservoir or compensating chamber for the working liquid to be sucked into the lower pump space with the upward piston stroke and as a receiver with the downward stroke. By the strokes in either direction the working liquid is raised and discharged through the valve 15, the throttling effect exercised therein on the said liquid causing the damping of the oscillations of the spring-supported part of the vehicle. The valve 15, being of non-return construction, permits the flow of liquid from the cylinder 10 to the liquid chamber 25 only in one direction, so that surging of the liquid back and forth in the compensating chamber and resultant foaming of said liquid is obviated.

The shock absorber represented by Fig. 2 is substantially identically devised. For the purpose of protecting the regulating means from damage and dirt, the fastening eye 33 of the piston rod is flanged and provided with a mantle 21 partly enveloping the upper end of the shell 12, and the head piece 29a. To obtain the desired accessibility, a large flange of the cap 23a is joined with a tubular extension 26 projecting downwards within the mantle 21 so as to serve as a handle when the tension of the spring 22 is to be varied by an angular movement of the cap 23a.

In a further modification of the shock absorber according to Fig. 3 the casing 12 fast on the head piece 29b is axially displaceable by means of screw threads 24 provided for on the foot piece and in the lower end of the casing so that by angular displacement of said casing the head piece 29b supporting the spring 22 can be lifted or lowered while a screw threaded ring 31 serves as a counter nut. In this construction, the member 35 serves as a packing gland for the piston rod 19 and does not serve as a spring adjusting member as in the case of member 23 in the construction of Fig. 1.

I claim:

1. A hydraulic double acting shock absorber including a pump cylinder, a piston reciprocable therein, a piston rod connected to said piston, a casing enclosing said cylinder and serving as a liquid container for the return flow, means for permitting passage of liquid from said cylinder to said container only in one direction and including a spring loaded non-return valve at the head of the cylinder axially disposed with respect to said cylinder and controlling the liquid flow between the interior of said cylinder and said liquid container, a threaded rotatable member co-axial with said cylinder and accessible for rotation from the outside of the shock absorber without the necessity of dismantling any part of said absorber, and means responsive to the rotation of said rotatable member for regulating the tension of the spring in said valve.

2. A hydraulic double acting shock absorber including a pump cylinder, a piston reciprocable therein, a piston rod connected to said piston, a casing enclosing said cylinder and serving as a liquid container for the return flow, a spring loaded valve controlling the liquid flow between the interior of said cylinder and said liquid container and comprising a valve member encircling said rod and seated on one end of said cylinder, a sleeve also encircling said rod, and a spring between said sleeve and said valve member, and a rotatable member encircling said rod, engaging said sleeve to hold the same against relative axial movement with respect to said rod and accessible for rotation from the outside of said shock absorber, and means responsive to the rotation of said rotatable member for axially moving said sleeve to selectively regulate the tension on said spring.

3. A shock absorber adapted to be fitted between the axle and the frame of an automobile vehicle and comprising a pump cylinder, a piston reciprocable therein, a piston rod connected to said piston, a casing surrounding said cylinder, and serving as a liquid container for the return flow, said casing having connected at its end a neck encircling said piston rod, a spring loaded valve at the head of said cylinder controlling the flow of liquid between said cylinder and said liquid container and including a valve member encircling said rod and seated on one end of said cylinder, a sleeve encircling said rod and slidable therealong in said neck, and a coil spring between said sleeve and said valve member and also encircling said rod, and a screw cap threaded onto said neck and engaging the upper end of said sleeve whereby upon rotation of said screw cap, said sleeve is moved along said rod to regulate the tension of said spring.

4. A hydraulic double acting shock absorber including a pump cylinder, a piston reciprocable therein, a piston rod connected to said piston, a casing enclosing said cylinder and serving as a liquid container for the return flow, a spring loaded valve at the head of the cylinder axially disposed with respect to said cylinder and controlling the liquid flow between the interior of said cylinder and said liquid container, a rotatable member having a skirt portion encircling said casing and forming a tubular handle by which said rotatable member may be rotated, and means responsive to the rotation of said rotatable member for regulating the spring on said valve.

5. A hydraulic shock absorber as claimed in claim 3 characterized by the feature of a skirt connected to the screw cap and encircling said casing, said skirt forming a tubular handle for rotating said screw cap.

6. A hydraulic shock absorber as claimed in claim 3 characterized by the features of a protective sleeve connected to said rod and encircling said casing, and a skirt connected to the screw cap and encircling said casing between said casing and said protective sleeve, said skirt extending longitudinally beyond said protective sleeve to form a tubular handle accessible from the outside of said absorber for rotating said screw cap.

7. A hydraulic shock absorber including a pump cylinder, a piston reciprocable therein, a piston rod connected to said piston, a casing encircling said cylinder and serving as a liquid container for the return flow, said casing and said cylinder having a threaded engagement therebetween whereby upon rotation of said casing, said casing will be moved axially with respect to said cylinder, a spring loaded valve at the head of said cylinder controlling the liquid flow between said cylinder and said container, and means responsive to the relaitve rotation of said casing and said cylinder for regulating the tension of the spring of said valve.

8. A shock absorber adapted to be fitted between the axle and the frame of an automobile vehicle and comprising a pump cylinder, a piston reciprocable therein, a piston rod connected to said piston, a casing surrounding said cylinder, and serving as a liquid container for the return flow, said casing having a neck at one end encircling said piston rod, and a spring loaded valve at the head of said cylinder controlling the flow of liquid between said cylinder and said liquid container and including a valve member encircling said rod and seated on one end of said cylinder, a sleeve encircling said rod, and slidable therealong, in said neck, and a coil spring between said sleeve and said valve member, and also encircling said rod, a cap member connected to said neck for rotation therewith and engaging the upper end of said sleeve, said casing and said cylinder having a threaded interengagement whereby upon relative rotation of said casing and said cylinder, said casing will be moved axially with respect to said cylinder and the tension of said spring will be varied.

RICHARD BINDER.
HERMANN KLEIN.